Nov. 7, 1961 M. OTA 3,007,733
EGG POACHER
Filed July 28, 1959
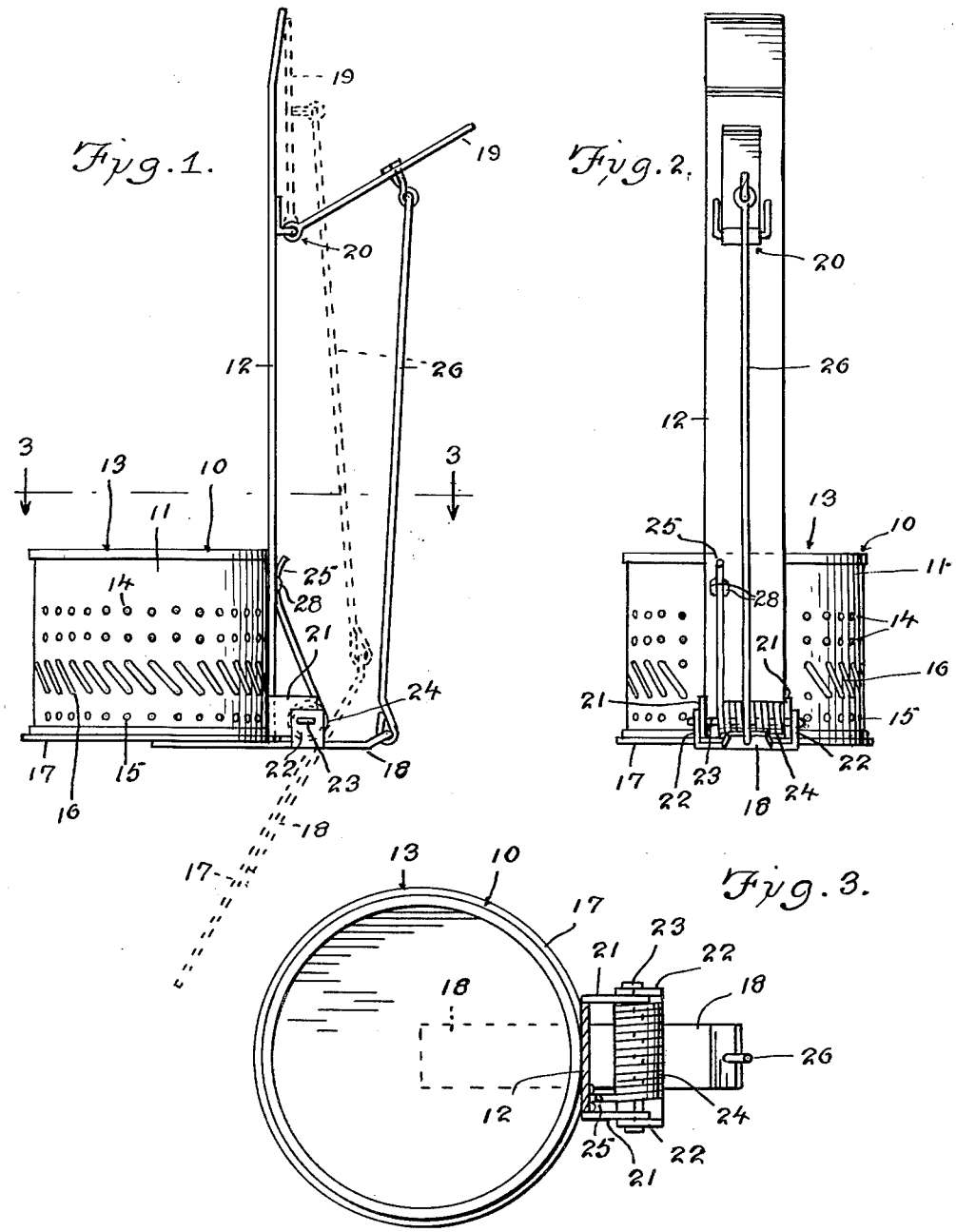
INVENTOR.
Masaharu Ota
BY *Victor J. Evans & Co.*
ATTORNEYS

United States Patent Office 3,007,733
Patented Nov. 7, 1961

3,007,733
EGG POACHER
Masaharu Ota, Box 1002, Lihue, Kauai, Hawaii
Filed July 28, 1959, Ser. No. 830,070
2 Claims. (Cl. 294—26.5)

This invention relates to a culinary utensil, and more particularly to an egg poacher.

The object of the invention is to provide a device which will facilitate the cooking or poaching of eggs.

Another object of the invention is to provide an egg poacher which is constructed so that the poached egg will cling to the bottom or closure so that the poached egg can be conveniently and readily removed from the device at the desired instant or time.

A further object of the invention is to provide an egg poacher which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a side elevational view of the egg poacher of the present invention.

FIGURE 2 is a view taken at right angles to the view shown in FIGURE 1.

FIGURE 3 is a sectional view taken on line 3—3 of FIGURE 1.

Referring in detail to the drawings, the numeral 10 indicates the egg poacher of the present invention which comprises a container 13 that includes annular side wall member 11 which has rows of apertures 14 and 15 therein as well as slots 16.

The numeral 17 indicates a closure or cover which is mounted for movement into and out of opened or closed relation with respect to the lower end of the container 13. A link 18 extends from the closure 17 and is affixed thereto in any suitable manner, as for example by welding. The numeral 12 indicates a vertically disposed stem which has its lower portion secured as by welding to the container 13, and a manually movable lever 19 is pivotally connected to the stem 12 as at 20.

Extending outwardly from the lower end of the stem 12 and secured thereto and formed integral therewith is is a pair of spaced parallel apertured ears 21. Spaced parallel apertured lugs 22 extend upwardly from the link 18 and a pivot pin 23 extends through the ears 21 and lugs 22. The numeral 24 indicates a coil spring which is mounted on the pin 23, and the coil spring 24 includes a portion 25 which engages the stem 12. As shown in FIGURES 1 and 2, projections or protuberances 28 are arranged on the stem 12, and these protuberances 28 are engaged by the portion 25 of the spring 24, and the portion 25 may be secured as by welding to the protuberances 28. The spring 24 is arranged so as to normally urge or bias the closure 17 into closed relation with respect to the lower end of the container 13. A rod 26 serves to connect the link 18 to the lever 19.

From the foregoing, it is apparent that there has been provided a culinary utensil which is especially suitable for use in poaching or cooking eggs. In use, with the closure 17 in closed relation with respect to the lower end of the container 13, the egg to be cooked or poached is placed in the container 13, and then the container is placed in a suitable receptacle, vessel, pot or the like containing water which is to be heated or boiled. The openings, such as the openings 14 and 15 permit the hot water to circulate into and out of the container 13 so that the necessary poaching or cooking of the egg will be accomplished. After a predetermined period of time, the device can be lifted out of the boiling water and the slots 16 as well as the other openings will permit the water to drain out of the container 13. The poached egg will remain on the upper surface of the closure 17 and to release or remove the poached egg, it is only necessary to manually pivot or move the lever 19 from the solid line position in FIGURE 1 to the dotted line position in FIGURE 1 and the lever 19 is moved on its pivot 20 toward the stem 12. This manual movement of the lever 19 raises the rod 26, and since the rod 26 is connected to the outer end of the link 18 which is secured to the closure 17, it will be seen that this manual movement of the lever 19 will result in opening or downward swinging movement of the closure 17 so that the poached egg can readily slide off or be removed from the closure and the poached egg can be deposited onto a piece of toast, plate or the like. When manual pressure is released on the lever 19, the spring member 24 will return the parts to the dotted line position in FIGURE 1 to the solid line position in FIGURE 1 so that the closure 17 will move from the dotted line position to the closed or solid line position of FIGURE 1.

The parts can be made of any suitable material and in different shapes or sizes.

The apertures 14 and 15 permit the water to pass therethrough, and the enlarged slots 16 are arranged or provided so that the water can more readily and quickly leave the container after the egg is cooked or poached. The poached egg will cling to the bottom member 17 as previously stated.

Minor changes in shape, design and rearrangement of details coming within the field of invention claimed may be resorted to in actual practice, if desired.

I claim:

1. An egg poacher comprising a container embodying a cylindrical side wall member having upper and lower rows of circular apertures, said side wall member having a plurality of spaced apart elongated slots which are positioned between said rows of apertures, a stem projecting upwardly from said container and having its lower end secured thereto, a manually movable lever pivotally connected to said stem, a closure for movement into and out of opened and closed relation with respect to the lower end of said container, a link affixed to said closure, a rod operatively connecting said link to said lever, a pair of spaced apart apertured ears projecting outwardly from the lower end of said stem and secured thereto, a pair of spaced parallel lugs projecting upwardly from said link, a pivot pin projecting through said lugs and ears, and a coil spring mounted on said pin for normally urging said closure into closed relation with respect to the lower end of the container, said coil spring including a portion which engages said stem.

2. An egg poacher comprising a container embodying a cylindrical side wall member having upper and lower rows of circular apertures, said side wall member having a plurality of spaced apart elongated slots which are positioned between said rows of apertures, a stem projecting upwardly from said container and having its lower end secured thereto, a manually movable lever pivotally connected to said stem, a closure for movement into and out of opened and closed relation with respect to the lower end of said container, a link affixed to said closure, a rod operatively connecting said link to said lever, a pair of spaced apart apertured ears projecting outwardly from the lower end of said stem and secured thereto, a pair of spaced parallel lugs projecting upwardly from said link, a pivot pin projecting through said lugs and ears, and a coil spring mounted on said pin for normally urging said closure into closed relation with respect to the lower end of the container, said coil spring including a portion which engages said stem, said apertures permitting water to circulate therethrough, and said slots being arranged so that water can more readily and quickly leave the container after an egg is cooked or poached.

References Cited in the file of this patent

UNITED STATES PATENTS

| | | |
|---|---|---|
| 685,172 | Quackenbush | Oct. 22, 1901 |
| 708,050 | Keis | Sept. 2, 1902 |
| 1,390,772 | Fontaine | Sept. 13, 1921 |
| 2,801,126 | White | July 30, 1957 |